United States Patent [19]
Aditya et al.

[11] Patent Number: 6,122,681
[45] Date of Patent: *Sep. 19, 2000

[54] SUPER PIPELINED ARCHITECTURE FOR TRANSMIT FLOW IN A NETWORK CONTROLLER

[75] Inventors: Vikas Aditya; Prakash Iyer, both of Hillsboro, Oreg.

[73] Assignee: Intel Corporation, Santa Clara, Calif.

[ * ] Notice: This patent is subject to a terminal disclaimer.

[21] Appl. No.: 09/335,206

[22] Filed: Jun. 17, 1999

Related U.S. Application Data

[63] Continuation of application No. 08/526,714, Sep. 11, 1995, Pat. No. 5,944,804.

[51] Int. Cl.[7] ................................................. G06F 13/42
[52] U.S. Cl. ................................................................ 710/52
[58] Field of Search ......................... 710/106, 52, 53, 710/56, 57, 129

[56] References Cited

U.S. PATENT DOCUMENTS

| | | | |
|---|---|---|---|
| 4,264,954 | 4/1981 | Briggs et al. | 364/200 |
| 4,493,021 | 1/1985 | Agrawal et al. | 364/200 |
| 5,175,732 | 12/1992 | Hendel et al. | 370/94.1 |
| 5,179,661 | 1/1993 | Copeland, III et al. | 395/250 |
| 5,307,459 | 4/1994 | Petersen et al. | 709/250 |
| 5,459,723 | 10/1995 | Thor | 370/60 |
| 5,485,584 | 1/1996 | Hausman et al. | 395/842 |
| 5,563,885 | 10/1996 | Witchey | 370/94.2 |

*Primary Examiner*—David Y. Eng
*Attorney, Agent, or Firm*—Blakely, Sokoloff, Taylor & Zafman LLP

[57] ABSTRACT

A system and method of by pipelining the flow of data in a bus mastered network controller. The concept of successful completion on copy is used. The bus mastering network controller indicates to the CPU that a frame has been successfully transmitted as soon as the data from main memory is copied across system bus to buffer memory in the controller. The driver layer of the network operating system upon receiving the successful completion on copy signal from bus mastering network controller 16 releases its own transmit frame descriptors and buffers associated with the copied frame which enables the lower protocol layer to initiate a new frame transmission while the previous one is still being transmitted. The CPU and bus mastering network controller do not contend for system bus during the setup of the new frame since bus mastering network controller continues transmission from buffer memory. The bus mastering network controller does not wait for a complete indication to transfer the next frame to buffer memory. Rather the next frame is transferred to buffer memory as the previous frame is being transferred to serial side of the controller. This keeps serial side always busy and the data throughput is only limited by the bandwidth capability of the physical link.

17 Claims, 4 Drawing Sheets

SUPER PIPELINED ARCHITECTURE FOR TRANSMIT FLOW IN A NETWORK CONTROLLER

CROSS-REFERENCE TO RELATED APPLICATIONS

This is a continuation of application Ser. No. 08/526,714, filed Sep. 11, 1995, entitled "Super Pipelined Architecture for Transmit Flow in a Network Controller," assigned to the Assignee of the present application, now U.S. Pat. No. 5,944,804, issued Aug. 31, 1999.

Please refer to application Ser. No. 08/541,925 filed on Oct. 10, 1995 by Aditya and Iyer, entitled METHOD OF COMMUNICATING DATA FROM A HOST TO A NETWORK CONTROLLER, assigned to the same assignee as the present invention now U.S. Pat. No. 5,729,681.

BACKGROUND OF THE INVENTION

1. Field of the Invention

The present invention relates to data transmission over computer networks. More particularly, it relates to improving the throughput of network controllers using bus mastering architecture.

2. Description of the Prior Art

A computer network is a system of hardware and software that allows two or more computers to communicate with each other. Networks are of several different kinds. For example, local area networks ("LAN") connect computers within a work-group or department. There are campus networks which extend to multiple buildings on a campus. There are metropolitan area networks, ("MAN") which span a city or metropolitan area. There are wide area networks ("WAN") that make connection between nodes in different cities, different state and different countries. An enterprise network connects all of the computers within an organization regardless of where they are located or of kind, Networks operate under a network operating system ("NOS") whose architecture is typically layered. That is, a layered architecture specifies different functions at different levels in a hierarchy of software functions. A typical layered architecture can be conceptualized as having five layers: a user interface layer at the top of the hierarchy followed by an upper protocol layer, a lower protocol layer, a driver layer and finally a physical layer at the bottom.

The user interface layer is the layer in which the data to be transmitted is created. For example, the user interface layer may be a word processor and the data to be sent is a file that was created by the user with the word processor.

The upper protocol layer specifies the destination of the data to be transmitted. It also passes the data to be transmitted to the lower protocol layer. Because the lower protocol layer cannot handle an unlimited amount of data at any given time, the upper protocol layer passes data to the lower protocol layer in predetermined quantities called packets.

The lower protocol layer includes the communications services which are a set of conventions which define how communication over the network will be structured. In general, data passed from the upper protocol layer as packets are broken down further by the lower protocol layer into frames. A frame is a data structure for transmitting data over a serial communication channel and typically includes a flag that indicated the start of the frame followed by an address, a control field, a data field and a frame check sequence field for error correction. The data field may be either fixed or variable. In the case of Ethernet, the frame is of variable size with a maximum size of 1,514 bytes. Also the functions of sequencing of frames, the pacing of frames, routing, and the like are done in the lower protocol layer. In performing these functions, the lower protocol layer establishes various descriptor and buffer fields in main memory.

The next layer down is typically called the driver layer. This layer is a software module that is specific to the network controller hardware. The purpose of a driver is to isolate the hardware specific software functions in one module to facilitate interchangeability of hardware and software components designed by different organizations. The driver programs the network controller to carry out functions and transfers data between the network controller and the lower protocol layer. In doing so, the driver layer passes various descriptor and buffer fields on to the physical layer.

The physical layer is the hardware which in a network includes the network controller and the physical link. If the physical link is linear, such as Ethernet, a carrier sense multiple access/collision detection (CSMA/CD) system is used in which a node sends a signal that every other node detects but only the addressed node interprets as useful data. If two nodes send signals at the same time, a collision occurs and both backoff, wait for a unique random amount of time and then try again.

Figure 1:
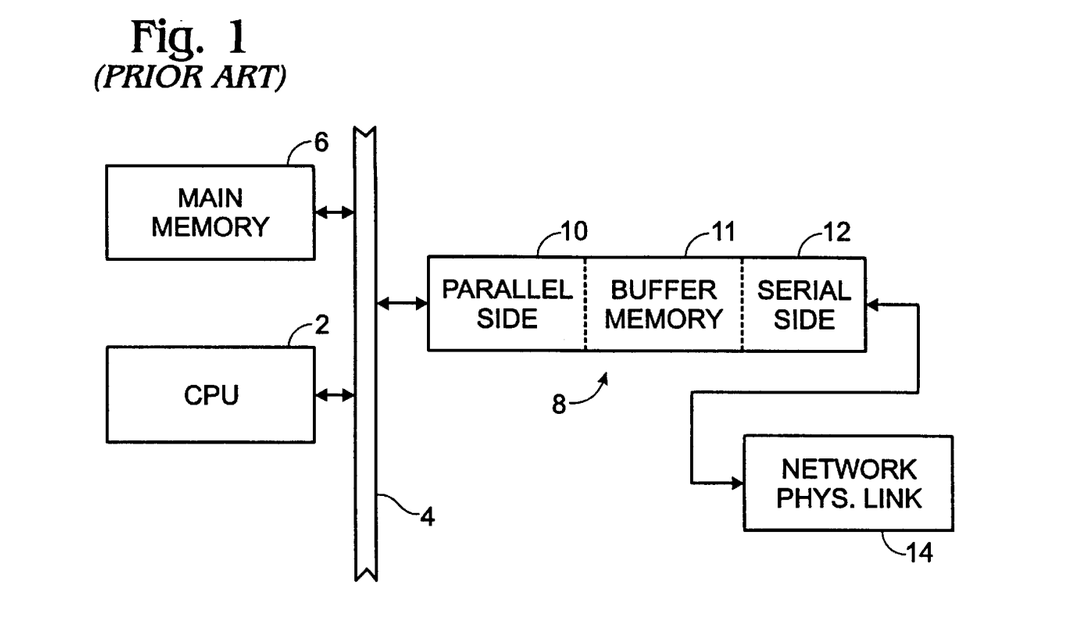
FIG. 1 is a block diagram of the general setting of the invention.

FIG. 1 is a block diagram of the general setting of the invention. Referring now to FIG. 1, a CPU 2, a main memory 6 and a bus mastering network controller 8 are connected to system bus 4.

Bus mastering network controller 8 consists of a parallel data side 10, a buffer memory 11 and a serial side 12. Parallel side 10 is connected to system bus 4 and serial side 12 is connected to network physical link 14. Bus mastering network controller 8 is specific to a particular type of network such as Ethernet, token ring, etc. and provides the attachment point for the network physical link such as coaxial cable, fiber optic cable, etc., wireless (where an antenna and base station are needed). Bus mastering network controllers are a class of network controllers that are capable of transferring data from main memory to the physical link directly without requiring any interaction by the host CPU. When a bus mastering network controller is used, a data frame is communicated from CPU 2 to bus mastering network controller 8 by having the driver layer set up transmit buffers and descriptors in main memory 6 that contain all of the information about the frame to be transmitted such as frame length, frame header and pointers to application data fragments. The bus mastering network controller is then able to transfer the data directly from the application fragments directly without requiring any data copy from the CPU. In order to do this, bus mastering controller 8 gains control of system bus 4 and reads or writes data directly to and from main memory 6.

Figure 2:
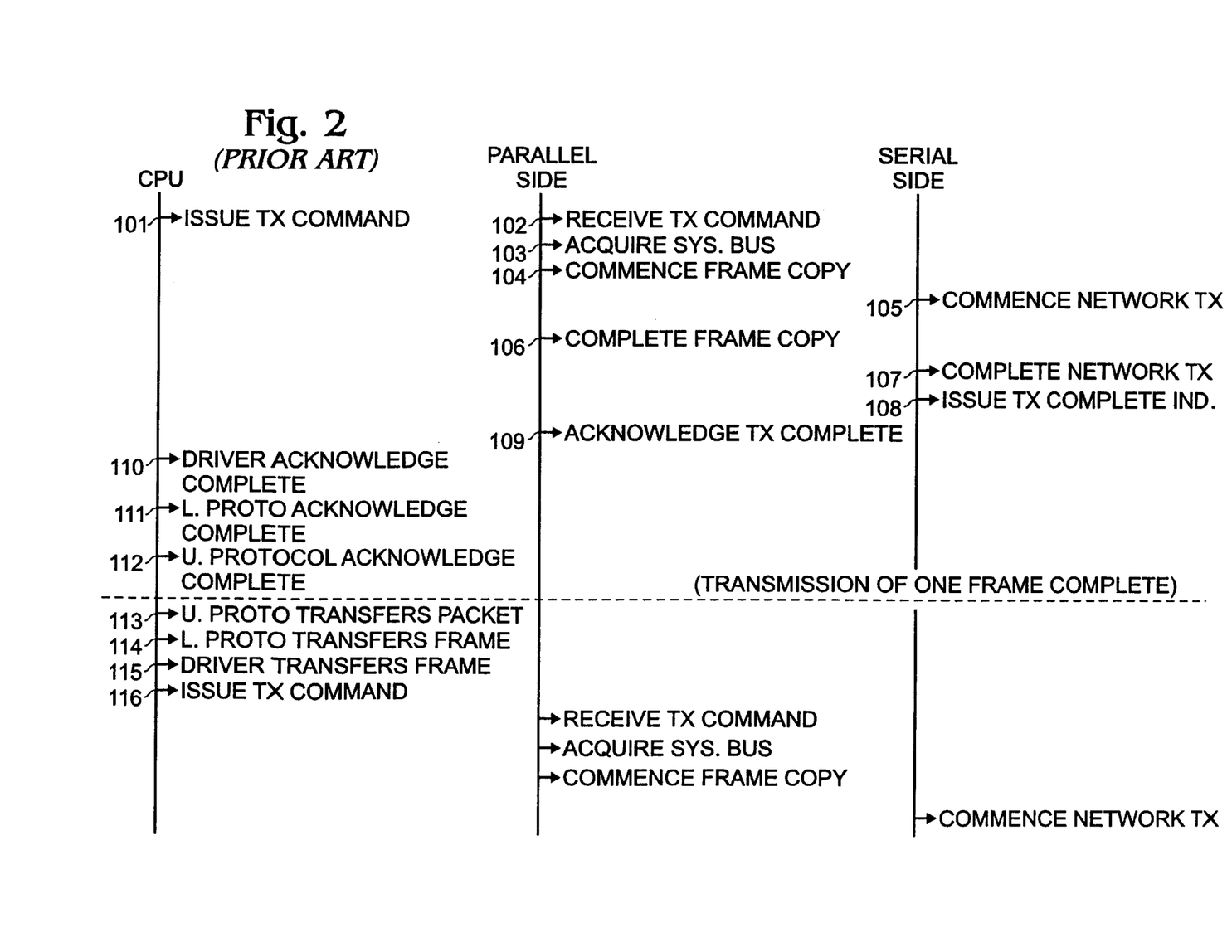
FIG. 2 is an event chart showing the operation of a prior art bus mastering network controller.

FIG. 2 is an event chart showing the operation of a prior art bus mastering network controller 16. In FIG. 2 the events run vertically from top to bottom in order of their occurrence. The events of CPU 2, parallel side 10 and serial side 12 are shown on separate event lines for clarity.

The sequence of events shown in FIG. 2 are accurate, but the time between events as illustrated in not intended to be to scale. Referring now to FIG. 2, at time 101, CPU 2 issues a transmit command (Tx) which is sent out over bus 4 to bus mastering network controller 8. At time 102, bus mastering network controller 8 receives the transmit command. At time 103, bus mastering network controller 8 completes acquisition of bus 4 at which point it drives all signals on bus 4. At time 104, the transfer of a frame of information from main memory 6 to buffer memory 11 is commenced. The frame transfer is in parallel over bus 4. In the case of modem computer architectures, bus 4 may be 32 or 64 bytes wide. The data transmission rate from main memory 6 over bus 4 to buffer memory 11 is much greater than the transmission of data over network physical link 14. For example, for a 100 Mbps FastEthernet link, it takes 122 microseconds to transmit a 1500 byte frame but takes only about 11 microseconds (this is a theoretical minimum with a system with a 32 bit, 33 Mhz PCI bus with 0 wait state memory) to copy the same frame across bus 4.

At time 105, serial side 12 commences transfer of data from buffer memory 11 onto network physical link 14. The difference in time between time 104 and 105 is known as the threshold period which is programmable parameter and is measured in units of bytes stored in buffer memory 11. This parameter is chosen to optimize the two objectives of starting transmissions over the physical link as soon as possible and avoiding an underrun condition.

At time 106, the copying of a complete frame from main memory to buffer memory 11 is complete. However, the transmission by the serial side 12 over the network physical link 14 has not yet been completed. It is not until time 107 that the transmission of the first frame of data is complete. The time between the event of copy of a complete frame at 106 and the event of completion of transmission of the frame at time 107 may vary substantially primarily because the serial side is slow compared to the bus speed and also because the serial side 12 may not be able to transmit immediately or there may be failures in transmission that require several retries. Thus the actual interval between events at times 106 and 107 may be very long.

At time 108, serial side 12 issues an indication that the transmission is complete. The indication may be in the form of an interrupt, writing to a particular location in main memory or setting a flag. At time 109 the transmission complete indication is acknowledged by parallel side 10. At time 110, the transmission complete is acknowledged by the CPU at the driver layer. At time 111, the transmission complete is acknowledged in the CPU at the lower protocol layer. At time 112, the transmission complete is acknowledged by the CPU at the upper protocol layer. At this point, transmission of one frame is complete.

A packet of data is the largest quantity of data that the lower protocol layer can handle at any one time. A packet may consist of one or more frames. If there are additional frames under the control of the lower protocol layer, they will be sent at this time. If there are no additional frames under the control of the lower protocol layer, the lower protocol layer will send a request for the next packet to be passed to it. At time 113, the upper protocol layer transfers the packet to the lower protocol layer. At time 114, the lower protocol layer transfers a frame to the driver layer. And at time 115, the driver layer programs the physical layer by passing various descriptor and buffer fields thereto. At time 18, the CPU issues the transmit a command to bus mastering network controller 8. Thereafter the process is a repeat of what was previously described.

Data throughput is affected in two ways by the architecture of the bus mastering network controller. One way is the time between frames being put out on the physical link by serial side 12. The second way is the time required to move data from main memory 6 to buffer memory 11. This includes the time to move data from either: 1, the lower protocol layer to buffer memory 11 if there are one or more frames under the control of the lower protocol layer; or 2, the upper protocol layer to buffer memory 11 if their are no packets under the control of the lower protocol layer.

In FIG. 2, the activities of CPU 2, parallel side 10 and serial side 12 are connected. In general, the driver layer programs the bus mastering network controller to copy data from application fragments and then returns to the NOS. With this approach, as can be seen from examining FIG. 2, there is a substantial period of time between the completion of frame copy at time 106 and the issue Tx complete indication at time 108. During this period, CPU 2 is idle with respect to transmission of data over the network. This limits the data transfer rate on frame transmissions.

SUMMARY OF THE INVENTION

The present invention is a system for the transmission portion of a bus mastering network controller connected to a system bus in a computer and intended for transmitting a data frame from the computer over a physical link of a network. A CPU and main memory are also connected to the system bus. The bus mastering network controller includes a buffer memory. It also includes a parallel side connected to the system bus which transfers data frames from the main memory to the buffer. The bus mastering network controller also contains a serial side which is connected to a physical link and which transmits frames written into the buffer in parallel over the physical link in a serial format. In operation, the parallel side commences copying a first frame of data from the main memory to the buffer memory. The serial side commences taking data from the first frame from the buffer memory, converting it to serial data and transmitting it over the physical link after a threshold quantity of data has been copied from the main memory to the buffer memory. The parallel side provides an indication to the CPU that the first frame has been successfully transmitted over the physical link immediately upon completion of copying of the first frame from main memory to the buffer memory. Upon receipt of the indication, the CPU then checks to determine if the buffer has room to accept data from a second frame of data and if so commences to copy the second frame of data from the main memory to the buffer memory. Upon completion of transmission of the first frame of data over the physical link, the serial side provides the parallel side with an indication thereof, and the parallel side reallocates the memory locations in the buffer memory associated with the first frame to storage of the second frame.

BRIEF DESCRIPTION OF THE DRAWING

The invention will now be described in connection with the drawing in which.

DESCRIPTION OF THE PREFERRED EMBODIMENT

The present invention solves the problems of the prior art by pipelining the flow of data. To do this, the concept of successful completion on copy is used. That is, the bus mastering network controller indicates to the CPU that a frame has been successfully transmitted not when it has actually been transmitted, but rather as soon as the data from the main memory is copied across system bus to the buffer memory. The driver layer upon receiving the successful completion of copy signal from the parallel side of the bus mastering network controller releases the transmit frame descriptors and buffers associated with the most recent frames copied from main memory to buffer memory. Since these buffers and descriptors are required by the lower protocol layer in setting up then next frame, releasing them, allows the lower protocol layer to initiate a new frame transmission while the previous one is still being transmitted. The next frame is transferred to the buffer memory as the previous frame is being transferred to the serial side. This keeps the serial side always busy and the data throughput is only limited by the bandwidth capability of the physical link. And, the CPU and bus mastering network controller 16 do not contend for the system bus during the setup of the new frame since the bus mastering network controller continues transmission from the buffer memory.

Figure 3:
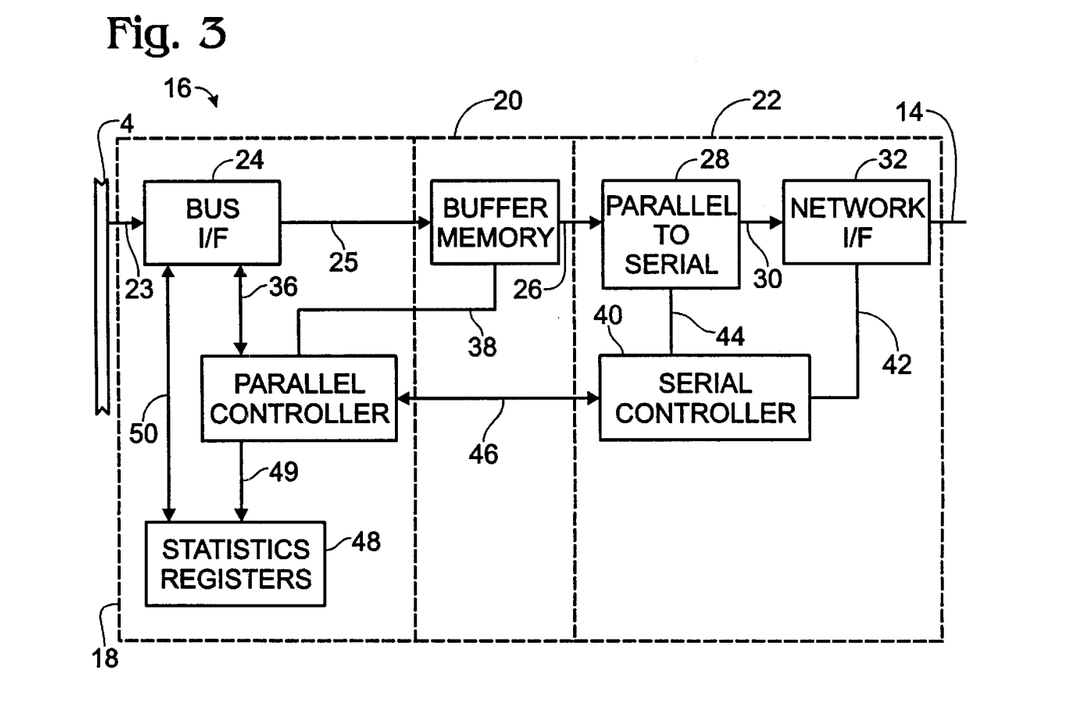
FIG. 3 is a block diagram of the bus mastering network controller of the present invention.

FIG. 3 is a block diagram of the important components in the transit path only for bus mastering network controller according to the present invention. Similar components would be found in the receive path. Referring now to FIG. 3, bus mastering network controller 16 is divided into three functional areas: a parallel data side 18 which is connected to system bus 4, a buffer memory section 20 and a serial data side 22 which is connected to physical link 14. In parallel data side 18, bus 4 is connected by signal path 23 to bus interface 24. Bus interface 24 performs the function of a direct memory access bus master which transfers data from system memory 14 of FIG. 1 to buffer memory section 20 and also performs I/O functions that allow CPU 2 to program bus mastering network controller 16 by writing to specified registers in parallel side controller 34. Bus interface 24 is connected by data path 22 to buffer memory 20.

Buffer memory 20 is connected by data path 26 to serial data side 22 and particularly to parallel to serial converter 28. Parallel to serial converter 28 is connected by data path 30 to network interface 32 which is in turn connected to network physical link 14. A parallel side controller 34 is connected by control signal path 36 to bus interface 24 and by control signal path 38 to buffer memory 20. A serial side controller 40 is connected by control signal path 42 to network interface 32 and by control signal path 44 to parallel to serial converter 28. Parallel side controller 34 and serial side controller 40 communicate with each other over signal path 46.

A set of statistics registers 48 addressable by CPU 10 are connected to parallel side controller 40 by signal path 49 and to bus interface 24 by signal path 50.

Parallel side controller 34 consists of a microcontroller and a read only memory which contains the instructions for the microcontroller. The microcontroller also accesses the various descriptors and buffers associated with each frame that are set up by the driver layer in CPU 2. The microcontroller also programs the direct memory access functions of bus interface 24.

Buffer memory 20 is necessary in part because of the difference in speed at which data is received from main memory 6 and the speed at which data can be sent out over network physical link 14. Data is transferred into buffer memory 20 as determined by the availability of and data transfer rate of bus 4 as well as the availability of free memory in buffer memory 20. Data is transferred out of buffer memory 20 on a first in, first out ("FIFO") basis at a rate that is based upon the availability of and the data transfer rate of network physical link 14.

Data is transferred from buffer 20 to serial side 22 in frames. If there is insufficient data in buffer memory 20 to supply a complete frame when requested by serial side controller 40, an underrun condition occurs. This is detected by serial side controller 40 and an indication transmitted to parallel side controller 34. In addition, when an underrun is detected by serial side controller 40, it sends a command to network interface 32 to send out a jam sequence. The parallel side upon receiving an indication from the serial side issues a series of automatic retries and also changes the threshold. In the case of an Ethernet, a jam sequence consists of 4096 bytes of data which can be anything. This is part of the protocol and will be detected at the receiving end as a failure to transmit that frame.

The size of buffer memory 20 is selected to be the optimum size memory for avoiding any underrun conditions, for commencing to read the next frame of data from main memory while the previous frame is being sent over the physical link and system cost. An underrun condition is undesirable because retries cause inappropriate use of network bandwidth and, all other things being equal, it slows down data transfer.

Parallel to serial converter 28 performs the function of converting data arriving at its input in one or more bytes to a string of serial data. When parallel data arrives, the conversion process starts immediately and converted data is immediately passed to network interface 32.

On the transmit side, network interface 32 performs the functions of monitoring the availability of the network physical link 14, and collision handling. It also detects errors and reports them via signal path 42 to serial side controller 40 where they are in turn stored in statistics registers 48. In the present invention, statistics registers 48 store the number of collisions that are experienced in excess of some predetermined number such as 15 and the number of underruns and any kind of error encountered when the frame was being transmitted over the physical link. In the prior art, a complete indication of such conditions is issued after finishing transmission of an entire frame, for example at time 212 in FIG. 4. At that time, the status of the transmission is known completely known and is transferred back to the CPU along with the complete indication. In the present invention, transmit statistics for completed frames cannot be kept in such a way. Since the driver layer has already freed up all of its descriptors and buffers associated with the frame, bus mastering network controller 16 cannot report such statistics on a frame by frame basis. This problem is solved by statistics registers 48. As frames are transmitted over physical link 14 by serial side 22, serial side controller 40 generates a message containing the status of the transmitted frame and passes this message over data path 46 to parallel side controller 34 which in turn updates statistics registers 48. The NOS has access to registers 48 through interface 24 as required.

Figure 4:
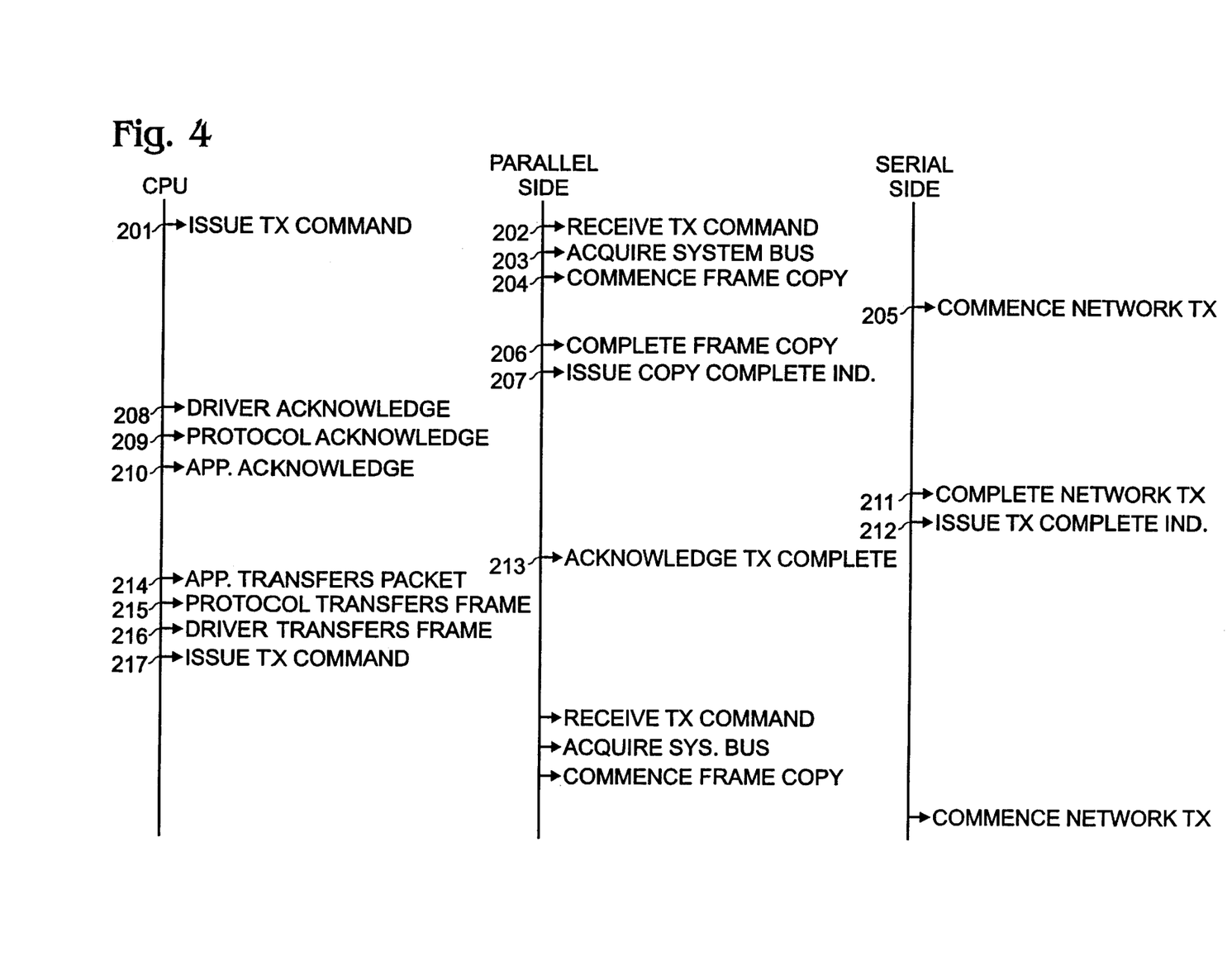
FIG. 4 is an event chart showing the operation of the present invention.

An event chart showing the operation of bus mastering network controller 16 according to the present invention is shown in FIG. 4. At time 201, CPU 2 issues a transmit command (Tx) which is sent out over bus 4 to bus mastering network controller 16. At time 202, bus mastering network controller 16 receives the transmit command. At time 203, as also in FIG. 2, bus mastering network controller 16 completes acquisition of bus 4. At time 204, as also in FIG. 2, the transfer of a frame of information from main memory 6 to buffer memory 20 is commenced.

The frame transfer is in parallel over bus 4. In the case of modem computer architectures, bus 4 may be 32 or 64 bytes wide. The data transmission rate from main memory 6 over bus 4 to buffer memory 20 is much greater than the transmission of data over network physical link 14. For example, for a 100 Mbps FastEthernet link, it takes 42 microseconds to transmit a 1500 byte frame but takes only about 11 microseconds to copy the same frame across bus 4. It is important that the size of buffer memory 20 is greater than the size of one frame data. In the case of Ethernet, a frame consists of 1,514 bytes. A preferred design for buffer memory 20 is 3,028 bytes which is two full size Ethernet frames.

At time 205, as also in FIG. 2, serial side controller 40 commences transfer of data from buffer 20 to parallel to serial converter 28 and hence to network interface 32 and onto network physical link 14. Again as in FIG. 2, the difference in time between time 204 and 205 is known as the threshold period which is a programmable parameter and is measured in units of bytes stored in buffer memory 20. At time 206, the copying of a complete frame from main memory to buffer memory 20 is complete.

So far the sequence of events of FIG. 4 has been the same as that of FIG. 2. However, at this point, the present invention differs from the prior art. After the complete frame copy event at time 206 in the present invention, parallel side controller 34 issues a frame copy complete indication at time 207. The indication may be in the form of an interrupt, writing to a particular location in main memory or setting a flag. The frame copy complete indication will appear to the NOS of CPU 2 as a transmission complete indication and will be responded to as such. Thus, the bus mastering network controller of the present invention will be compatible with all existing NOS that support prior art bus mastering network controllers.

From time 207, parallel side 18 and serial side 22 operate substantially independently. At time 207, the transmission by serial side 22 over the network physical link 14 has not yet been completed. However, parallel side 18 continues to interact with CPU 2 to write the next frame to buffer memory 20 while serial side 22 continues to pull data from buffer 20, convert it to serial data and transmit it over physical link 14.

Referring again to FIG. 4, at time 208, the transmission complete is acknowledged by the CPU at the driver layer. At time 209, the transmission complete is acknowledged in the CPU at the lower protocol layer. At time 210, the transmission complete is acknowledged in CPU 2 at the upper protocol layer. At time 211, transmission of the first frame of data is complete. Times 210 and 211 are determined by independent events and are not necessarily the same. At time 212, serial side 22 issues an indication that the transmission is complete At time 213, parallel side 18 acknowledges receipt of the Tx complete indication from serial side 22. Events 212 and 213 are the only interaction between parallel side 18 and serial side 22. This interaction is necessary since it allows parallel side controller 34 to reallocate memory in buffer memory 20. That is, as memory locations are freed up because a frame has been successfully transmitted over physical link 14, such memory locations are made available for copying a new frame from main memory 6. At time 214, the upper protocol layer of the network operating system transfers a new packet. At time 215 the lower protocol layer transfers the next frame to the driver layer. At time 216, the driver layer programs bus mastering network controller 16. At time 217, CPU 2 issues the Tx command for the next frame. At this point, the process for one frame is complete. Note that parallel side 18 and serial side 22 operate much more independently. This is known as a super pipelining architecture.

Figure 5:
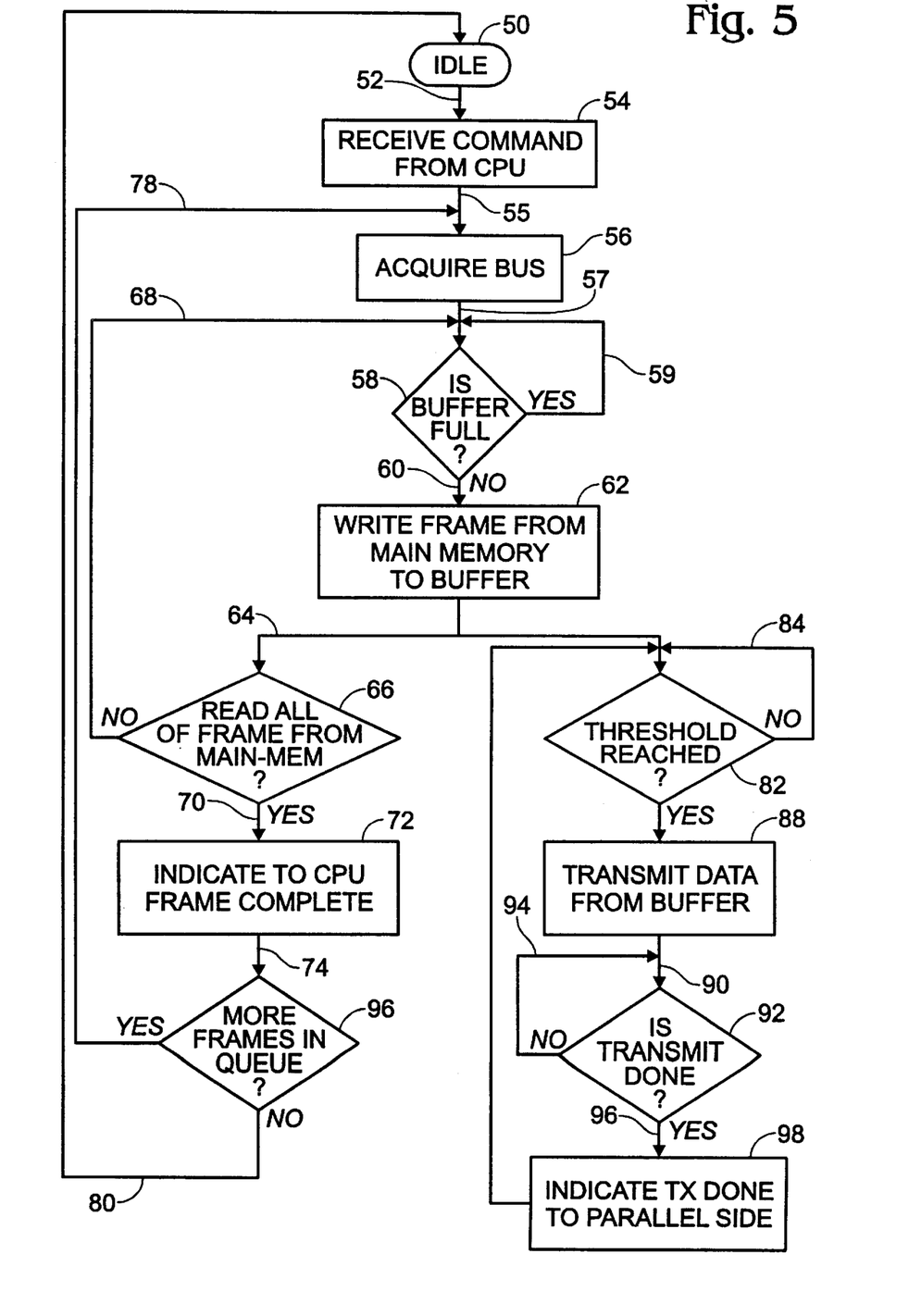
FIG. 5 is a flow chart showing the operation of the present invention.

FIG. 5 is a flow chart of the invention. At reference numeral 50, bus mastering network controller 16 is in an idle state. From the idle condition, follow data path 52 to process step 54. In process step 54, bus mastering network controller 16 receives a Tx command from the NOS in CPU 2. From process step 54, follow process path 55 to process step 56 where bus mastering network controller 16 acquires system bus 4. From process step 56, follow process path 57 to decision block 58. Decision block 58 tests to determine if there are any unused memory location in buffer memory 20. It may be full because, for example, serial side 22 could not acquire access to network physical link 14. Full is defined as having less than four available bytes. If buffer memory 20 is full, follow process path 59 and repeat the test of decision block 58. If buffer memory 20 is not full, follow process path 60 to process step 62 where parallel side 18 of bus mastering network controller 16 initiates copying a frame from main memory 6 to buffer memory 20. Next follow process path 64 to decision block 66 which tests to determine if an entire frame has been copied from main memory 6 into buffer memory 20. If no, follow process path 68 back to decision block 58 and repeat. If yes, follow process path 70 to process block 72 which posts an indication to CPU 2 that the transmission of a frame from main memory 6 to buffer memory 20 is complete. From process step 72 follow process path 74 to decision block 76 which tests to determine if there are more frames in main memory 6 that have been queued up by the lower protocol layer of the NOS in CPU 2. If yes, follow process path 78 to process block 56 and repeat the process. If no, follow process path 80 which returns bus mastering network controller 16 to an idle condition.

For serial side events, follow process path 65 from process step 62 to decision block 82. Decision block 82 tests to determine if the threshold number of bytes of data are present in buffer memory 20. If the number of bytes in buffer memory 20 has not reached the threshold number, follow process path 84 to retest. This loop continues until enough bytes of data have been written from main memory 6 to buffer memory 20. When the number of bytes in buffer memory 20 has reached the threshold, follow process path 86 to process block 88, at which point serial side 22 commences the transmission of data from buffer memory 20. From process block 88, follow process path 90 to decision block 92 which determines if transmission of the frame is complete. If no, follow process path 94 to retest. This loop continues until the current frame has been transmitted. If yes, follow process path 96 to process block 98 which posts an indication to parallel side 18 that the transmission of a frame is complete. This indication is required by the parallel side so that it can control buffer memory 20. That is, it knows that certain locations in buffer have been successfully transmitted, and thus those memory locations may be reallocated for new data coming from main memory 6.

In the process as set out in connection with FIGS. 4 and 5, the driver layer of the NOS frees up all of its resources related to a particular frame when the Tx complete indication is acknowledged at time 208. Thus, bus mastered network controller 16 cannot report transmission statistics on a per frame basis as is done in the prior art. Indeed, the present invention assumes that each frame is successfully transmitted as soon as it is copied to buffer 20 and the Tx complete command is issued. But not every attempt at a frame transmission is successful. According to the present invention, this possibility is handled by requiring that buffer memory 20 retain a copy of the frame being sent until the complete network TX indication is acknowledged by parallel side 18 at time 24. Thus, if a frame fails to be sent correctly, it is sensed by serial side controller 40 and communicated to parallel side controller 34 and a series of retries is initiated. In addition, if the failure to transmit is due to an underrun condition, parallel side controller may change the threshold number of bytes. The transmit statistics relating to collisions, underruns, and the like are kept in registers that are internal and associated with parallel side controller 34. As frames are transmitted by serial side 22, an internal message is generated and passed to parallel side controller 34 over signal path 46. Parallel side controller 34 updates a set of registers associated therewith. This data is then made available to the NOS on an inquiry basis. That is, these counters are interrogated by the NOS only when it has a need to know and thus reduces the bandwidth consumed by transmitting frame statistics on each successful frame transmit as done in the prior art.

The foregoing preferred embodiments are subject to numerous adaptations and modifications without departing from the concept of the invention. Therefore, within the scope of the appended claims, the invention may be practiced other than as specifically described herein.

What is claimed is:

1. A method for controlling data transmission over a data network, comprising:

copying data to be transmitted from a main memory in a host computer to a buffer memory in a network controller;

transmitting data from the buffer memory over a physical link of the data network in response to a threshold quantity of the data having been copied to the buffer memory from the main memory; and providing an indication to the host computer that a frame of data has been successfully transmitted from the buffer memory over the physical link of the data network prior to the frame of data being completely transmitted from the buffer memory over the physical link of the data network.

2. The method of claim 1 further comprising unallocating memory locations in the buffer memory upon successful transmission of the frame of data over the physical link.

3. The method of claim 1 wherein the threshold quantity of data is less than a frame of data.

4. The method of claim 1 wherein the threshold quantity of data is greater than a frame of data.

5. The method of claim 1 wherein the network controller monitors transmit events of the data network while transmitting data over the physical link of the data network.

6. The method of claim 5 wherein the network controller maintains a statistical history of transmit events identified while transmitting data over the physical link of the data network.

7. An apparatus facilitating the transmission of data over a physical link of a data network, comprising:

a buffer memory having a plurality of memory locations; and a controller coupled to the buffer memory, the controller to initiate transmission of data from the buffer memory over the physical link in response to a threshold quantity of data having been copied into the buffer memory from a coupled host computer, the controller to provide to the host computer an indication of successful frame transmission from the buffer memory over the physical link prior to a complete frame transmission from the buffer memory over the physical link.

8. The apparatus of claim 7 wherein the the controller provides to the host computer the indication in response to a frame of data having been copied into the buffer memory from the coupled host computer.

9. The apparatus of claim 7 wherein the indication is a transmit complete signal.

10. The apparatus of claim 7 wherein the controller monitors transmit events of the data network while data is being transmitted over the physical link of the data network.

11. The apparatus of claim 7 further comprising a storage medium wherein a statistical history compiled by the controller is maintained.

12. A computer system comprising:

a central processing unit (CPU);

a bus coupled to the CPU;

a main memory coupled to the bus; and a bus controller coupled between the bus and a physical link of a data network, the bus controller including buffer memory having a plurality of memory locations, the bus controller to initiate transmission of data from the buffer memory over the physical link in response to a threshold quantity of data having been copied into the buffer memory from the main memory, the bus controller to provide to the CPU an indication of successful frame transmission from the buffer memory over the physical link prior to a complete frame transmission from the buffer memory over the physical link.

13. The computer system of claim 12 wherein the the controller provides to the CPU the indication in response to a frame of data having been copied into the buffer memory from the main memory.

14. The computer system of claim 12 wherein the predetermined quantity of data is a frame of data.

15. The computer system of claim 12 wherein the indication is a transmit complete signal.

16. The computer system of claim 12 wherein the bus controller monitors transmit of the data network events while data is being transmitted over the physical link of the data network.

17. The computer system of claim 12 wherein the bus controller includes a storage medium in which a statistical history compiled by the bus controller is maintained.

* * * * *

UNITED STATES PATENT AND TRADEMARK OFFICE
CERTIFICATE OF CORRECTION

PATENT NO.    : 6,122,681                                                Page 1 of 1
DATED         : September 19, 2000
INVENTOR(S)   : Aditya et al.

It is certified that error appears in the above-identified patent and that said Letters Patent is hereby corrected as shown below:

Column 3,
Line 3, delete "modem" and insert -- modern --.
Line 58, delete "transmit a command" and insert -- transmit command --.

Column 7,
Line 4, delete "modem" and insert -- modern --.

Signed and Sealed this

Fourth Day of June, 2002

Attest:

JAMES E. ROGAN
Attesting Officer       Director of the United States Patent and Trademark Office

(12) EX PARTE REEXAMINATION CERTIFICATE (5533rd)
United States Patent
Aditya et al.

(10) Number: US 6,122,681 C1
(45) Certificate Issued: *Sep. 26, 2006

(54) SUPER PIPELINED ARCHITECTURE FOR TRANSMIT FLOW IN A NETWORK CONTROLLER

(75) Inventors: Vikas Aditya, Hillsboro, OR (US); Prakash Iyer, Hillsboro, OR (US)

(73) Assignee: Intel Corporation, Santa Clara, CA (US)

Reexamination Request:
No. 90/007,490, Mar. 31, 2005

Reexamination Certificate for:
Patent No.: 6,122,681
Issued: Sep. 19, 2000
Appl. No.: 09/335,206
Filed: Jun. 17, 1999

(*) Notice: This patent is subject to a terminal disclaimer.

Certificate of Correction issued Jun. 4, 2002.

Related U.S. Application Data (63) Continuation of application No. 08/526,714, filed on Sep. 11, 1995, now Pat. No. 5,944,804.

(51) Int. Cl.
*G06F 13/42* (2006.01)

(52) U.S. Cl. .................. 710/52; 710/53; 710/106; 710/56; 710/57; 709/250; 709/236

(58) Field of Classification Search .............. 710/52, 710/106
See application file for complete search history.

(56) References Cited

U.S. PATENT DOCUMENTS

| | | |
|---|---|---|
| 5,136,582 A | 8/1992 | Firoozmand |
| 5,210,749 A | 5/1993 | Firoozmand |
| 5,247,626 A * | 9/1993 | Firoozmand ............ 709/212 |
| 5,293,487 A | 3/1994 | Russo et al. |
| 5,307,459 A * | 4/1994 | Petersen et al. ............ 709/250 |
| 5,319,752 A * | 6/1994 | Petersen et al. ............ 709/234 |
| 5,434,872 A | 7/1995 | Petersen et al. |
| 5,687,316 A | 11/1997 | Graziano et al. |
| 5,732,094 A * | 3/1998 | Petersen et al. ............ 714/805 |
| 5,740,467 A | 4/1998 | Chmielecki, Jr. et al. |

OTHER PUBLICATIONS

3Com Corporation, *PCI/EISA Bus–Master Adapter Driver Technical Reference*, Manual Part No. 09–0681–001B, May 1995.

Intel Corporation, *D29C EAS Rev. 0.2*, 82556 product information, Sep. 2, 1993, pp. 2–34.

Intel Corporation, *82596DX and 82596SX High–Performance 32–Bit Local Area Network Coprocessor*, Order No. 290219–005, Oct. 1992.

(Continued)

*Primary Examiner*—St. John Courtenay, III (57) ABSTRACT

A system and method of by pipelining the flow of data in a bus mastered network controller. The concept of successful completion on copy is used. The bus mastering network controller indicates to the CPU that a frame has been successfully transmitted as soon as the data from main memory is copied across system bus to buffer memory in the controller. The driver layer of the network operating system upon receiving the successful completion on copy signal from bus mastering network controller 16 releases its own transmit frame descriptors and buffers associated with the copied frame which enables the lower protocol layer to initiate a new frame transmission while the previous one is still being transmitted. The CPU and bus mastering network controller do not contend for system bus during the setup of the new frame since bus mastering network controller continues transmission from buffer memory. The bus mastering network controller does not wait for a complete indication to transfer the next frame to buffer memory. Rather the next frame is transferred to buffer memory as the previous frame is being transferred to serial side of the controller. This keeps serial side always busy and the data throughput is only limited by the bandwidth capability of the physical link.

OTHER PUBLICATIONS

*Order of Final Judgment,* issued by the U.S. District Court for the Eastern District of Texas, Texarkana Division in re: *Broadcom Corporation* v. *Intel Corporation,* Civil Action No. 5:01–CV–302–DF, Aug. 5, 2003.

*Order,* issued by the U.S. District Court for the Eastern District of Texas, Texarkana Division in re: *Broadcom Corporation* v. *Intel Corporation,* Civil Action No. 5:01–CV–302–DF, Jul. 7, 2003.

*Intel's Claim Construction Brief Regarding Intel's '659, '681, and '804 Patents and Broadcom's '198 Patent,* filed in the U.S. District Court for the Eastern District of Texas, Texarkana Division in re: *Broadcom Corporation* v. *Intel Corporation,* Civil Action No. 5:01–CV–302–DF, Oct. 21, 2002.

*Broadcom Corporations* [sic] *Claim Construction Brief Regarding U.S. Pat. Nos. 5,944,804 and 6,122,681,* filed in the U.S. District Court for the Eastern District of Texas, Texarkana Division in re: *Broadcom Corporation* v. *Intel Corporation,* Civil Action No. 5:01–CV–302–DF, Nov. 4, 2002.

*Markman Order Construing the '659, '804 and '681 Patents,* issued by the U.S. District Court for the Eastern District of Texas, Texarkana Division in re: *Broadcom Corporation* v. *Intel Corporation,* Civil Action No. 5:01–CV–302–DF, May 9, 2003.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 5–8, 10–14, 16 and 17 are cancelled.

Claims 4, 9 and 15 are determined to be patentable as amended.

New claims 18–45 are added and determined to be patentable.

4. [The method of claim 1] *A method for controlling data transmission over a data network, comprising:*
   *copying data to be transmitted from a main memory in a host computer to a buffer memory in a network controller;*
   *transmitting data from the buffer memory over a physical link of the data network in response to a threshold quantity of the data having been copied to the buffer memory from the main memory; and*
   providing an indication to the host computer that a frame of data has been successfully transmitted from the buffer memory over the physical link of the data network prior to the frame of data being completely transmitted from the buffer memory over the physical link of the data network, wherein the threshold quantity of data is greater than a frame of data *and wherein the indication is independent of confirmation of successful frame transmission.*

9. [The apparatus of claim 7] *An apparatus facilitating the transmission of data over a physical link of a data network, comprising:*
   *a buffer memory having a plurality of memory locations; and*
   *a controller coupled to the buffer memory, the controller to initiate transmission of data from the buffer memory over the physical link in response to a threshold quantity of data having been copied into the buffer memory from a coupled host computer, the controller to provide to the host computer an indication of successful frame transmission from the buffer memory over the physical link prior to a complete frame transmission from the buffer memory over the physical link,* wherein the indication is a transmit complete signal *and wherein the indication is independent of confirmation of successful frame transmission.*

15. [The computer system of claim 12] *A computer system comprising:*
   *a central processing unit (CPU);*
   *a bus coupled to the CPU;*
   *a main memory coupled to the bus; and*
   *a bus controller coupled between the bus and a physical link of a data network, the bus controller including a buffer memory having a plurality of memory locations, the bus controller to initiate transmission of data from the buffer memory over the physical link in response to a threshold quantity of data having been copied into the buffer memory from the main memory, the bus controller to provide to the CPU an indication of successful frame transmission from the buffer memory over the physical link prior to a complete frame transmission from the buffer memory over the physical link,* wherein the indication is a transmit complete signal *and wherein the indication is independent of confirmation of successful frame transmission.*

*18. The method of claim 4 further comprising unallocating memory locations in the buffer memory in response to successful transmission of the frame of data over the physical link.*

*19. The method of claim 4, further comprising retaining a copy of the transmitted frame at least until successful transmission of the frame of data over the physical link.*

*20. The method of claim 4, further comprising monitoring transmit events of the data network while transmitting data over the physical link of the data network.*

*21. The method of claim 4, further comprising maintaining a statistical history of transmit events identified while transmitting data over the physical link of the data network.*

*22. The method of claim 4, further comprising:*
   *providing an indication of failure to transmit the frame; and*
   *selectively adjusting the threshold quantity in response to failure to transmit the frame.*

*23. The method of claim 4, wherein the host computer is to selectively provide additional data to be transmitted from the main memory to the buffer memory in response to the indication.*

*24. The apparatus of claim 9, wherein the controller is to provide to the host computer the indication in response to a frame of data having been copied into the buffer memory from the coupled host computer.*

*25. The apparatus of claim 9, wherein the controller is to monitor transmit events of the data network while data is being transmitted over the physical link of the data network.*

*26. The apparatus of claim 9, further comprising a storage medium wherein the storage medium is to maintain a statistical history compiled by the controller.*

*27. The apparatus of claim 9, wherein the controller is to unallocate memory locations in the buffer memory in response to successful transmission of the frame of data over the physical link.*

*28. The apparatus of claim 9, further comprising a memory, wherein the memory is to retain a copy of the transmitted frame at least until successful transmission of the frame of data over the physical link.*

*29. The apparatus of claim 9, wherein the controller is to:*
   *provide an indication of failure to transmit the frame; and*
   *selectively adjust the threshold quantity in response to failure to transmit the frame.*

*30. The apparatus of claim 9, wherein the host computer is to selectively provide additional data to be transmitted to the buffer memory in response to the indication.*

*31. The computer system of claim 15, wherein the controller is to provide to the CPU the indication in response to a frame of data having been copied into the buffer memory from the main memory.*

*32. The computer system of claim 15, wherein the predetermined quantity of data is a frame of data.*

*33. The computer system of claim 15, wherein the bus controller is to monitor transmit of the data network events while data is being transmitted over the physical link of the data network.*

34. The computer system of claim 15, wherein the bus controller includes a storage medium to maintain a statistical history compiled by the bus controller.

35. The computer system of claim 15, wherein the bus controller is to unallocate memory locations in the buffer memory in response to successful transmission of the frame of data over the physical link.

36. The computer system of claim 15, further comprising a memory to retain a copy of the transmitted frame at least until successful transmission of the frame of data over the physical link.

37. The computer system of claim 15, wherein the bus controller is to:

provide an indication of failure to transmit the frame; and selectively adjust the threshold quantity in response to failure to transmit the frame.

38. The computer system of claim 15, wherein the CPU is to selectively initiate providing of additional data to be transmitted to the buffer memory in response to the indication.

39. A method for controlling data transmission over a data network, comprising:

copying data to be transmitted from a main memory in a host computer to a buffer memory in a network controller;

transmitting data from the buffer memory over a physical link of the data network in response to a threshold quantity of the data having been copied to the buffer memory from the main memory; and providing an indication to the host computer that a frame of data has been successfully transmitted from the buffer memory over the physical link of the data network prior to the frame of data being completely transmitted from the buffer memory over the physical link of the data network, wherein the indication is independent of confirmation of successful frame transmission.

40. The method of claim 39, further comprising unallocating memory locations in the buffer memory upon successful transmission of the frame of data over the physical link.

41. The method of claim 39, further comprising retaining a copy of the transmitted frame at least until successful transmission of the frame of data over the physical link.

42. The method of claim 39, further comprising monitoring transmit events of the data network while transmitting data over the physical link of the data network.

43. The method of claim 39, further comprising maintaining a statistical history of transmit events identified while transmitting data over the physical link of the data network.

44. The method of claim 39, further comprising:

providing an indication of failure to transmit the frame; and selectively adjusting the threshold quantity in response to failure to transmit the frame.

45. The method of claim 39, wherein the host computer selectively provides additional data to be transmitted from the main memory to the buffer memory in response to the indication.

\* \* \* \* \*